United States Patent [19]

Batzar et al.

[11] Patent Number: 5,667,891
[45] Date of Patent: Sep. 16, 1997

[54] RANDOMLY PATTERNED COOKWARE

[75] Inventors: Kenneth Batzar, Cherry Hill, N.J.; Sharon Adolph McMenamin, Chadds Ford, Pa.

[73] Assignee: E. I. Du Pont de Nemours and Company, Wilmington, Del.

[21] Appl. No.: 585,984

[22] Filed: Jan. 16, 1996

[51] Int. Cl.$^6$ ........................ B32B 9/00
[52] U.S. Cl. ................ 428/389; 428/195; 428/207; 428/212; 428/324; 428/329; 428/403; 428/421; 428/454; 428/458; 428/463; 524/171; 524/520; 427/203; 427/205; 427/409
[58] Field of Search .................. 428/421, 458, 428/422, 463, 324, 327, 454, 403, 195, 200, 201, 206, 207, 209, 212, 245, 260, 262, 378, 389, 329; 427/203, 409, 205, 258, 385.5, 267, 419.2; 524/171, 520, 502

[56] References Cited

U.S. PATENT DOCUMENTS

| | | | |
|---|---|---|---|
| 3,087,827 | 4/1963 | Klenke et al. | 106/291 |
| 3,087,828 | 4/1963 | Linton | 106/291 |
| 3,087,829 | 4/1963 | Linton | 106/291 |
| 4,014,834 | 3/1977 | Concannon | 260/29.2 |
| 4,087,394 | 5/1978 | Concannon | 260/29.6 |
| 4,118,537 | 10/1978 | Vary | 428/422 |
| 4,123,401 | 10/1978 | Berghmans et al. | 260/29.6 |
| 4,169,083 | 9/1979 | Vassiliou | 260/23 |
| 4,180,609 | 12/1979 | Vassiliou | 428/212 |
| 4,259,375 | 3/1981 | Vassiliou | 427/267 |
| 4,311,634 | 1/1982 | Vassiliou | 260/42.27 |
| 4,351,882 | 9/1982 | Concannon | 428/422 |
| 4,677,000 | 6/1987 | Gardaz et al. | 427/261 |
| 4,711,802 | 12/1987 | Tannenbaum | 428/207 |
| 5,079,073 | 1/1992 | Tannenbaum | 428/216 |
| 5,106,682 | 4/1992 | Matsushita et al. | 428/324 |
| 5,194,336 | 3/1993 | Yamada | 428/421 |
| 5,233,358 | 8/1993 | Yamada et al. | 430/18 |
| 5,240,775 | 8/1993 | Tannenbaum | 428/422 |
| 5,250,356 | 10/1993 | Batzar | 428/421 |

FOREIGN PATENT DOCUMENTS

| | | |
|---|---|---|
| 285 161 | 2/1992 | European Pat. Off. . |
| 2 594 673 - A3 | 8/1987 | France . |
| 1 572 842 | 8/1980 | United Kingdom . |
| 2 174 315 | 11/1986 | United Kingdom . |

OTHER PUBLICATIONS

Paint and Surface Coatings: Theory and Practice, Ellis Horwood Limited, p. 185.

Ruth M. Johnston and Max Saltzman, Industrial Color Technology, *American Chemical Society*.

*Primary Examiner*—Patrick Ryan
*Assistant Examiner*—Abraham Bahta

[57] ABSTRACT

Patterned cookware coatings can be obtained with colors not readily available from reflective pigments by additive color mixing of interference colors using oxide coated mica.

6 Claims, No Drawings

RANDOMLY PATTERNED COOKWARE

BACKGROUND OF THE INVENTION

U.S. Pat. No. 4,259,375 (Vassiliou - 1981) discloses an article of cookware with a 3-layer coating having a discontinuous speckled or spattered pattern in a partial layer directly beneath the topcoat. The spattered coating is deliberately sprayed directly on an underlying layer while this layer is still wet and soft so that the spattered layer sinks into the under layer thereby forming a smooth finish. The spattered layer dots were also sprayed on directly, such as at 90 degrees from the substrate, so as to form generally round dots.

U.S. Pat. Nos. 5,194,336 (Yamada- 1993) and 5,106,682 (Matsushita et al - 1992) disclose using mica particles coated with interference thicknesses of various oxides, especially TiO2, to obtain different colors in cookware coatings. These patents confirm that it was conventionally believed that interference colors mix to form other colors following additive color rules as do lights from different sources, e.g., red plus green forms yellow. In additive color mixing the interference pigments produce color by the interference of reflected light. This is in contrast to subtractive color mixing affects obtained with reflective pigments wherein color is achieved by the partial absorbance of incident light so that red plus green would form a muddy brown. A discussion of additive and subtractive color mixing is disclosed in Paint and Surface Coatings: Theory and Practice, Ed. R. Lambourne, John Wiley & Sons, p.185, and Industrial Color Technology, R. M. Johnson and M. Saltzman, Advances in Chemistry Series 107, American Chemical Society, p.8 (1971).

The disclosure oft he aforementioned patents and publications is hereby incorporated by reference.

FIELD OF THE INVENTION

The instant invention relates to non-stick coated article, with a decorative pattern visible through a light transmitting topcoat. The instant invention also relates to a decorative pattern coating for cookware with color effects not readily available with reflective pigments.

SUMMARY OF THE INVENTION

The present invention provides a surface, e.g., an article of cookware having a cooking surface, which comprises a multilayer, non-stick coating which minimizes sticking by food residues and which is heat resistant by being stable at temperatures above about 300° C. on a substrate, wherein the coating comprises a primer adhered to a suitable substrate, a non-stick, heat-resistant light-transmitting topcoat, and optionally one or more intermediate coats, with the topcoat adhered to any such intermediate coats. The optional intermediate coats are adhered through a discontinuous layer to the primer, or in the absence of intermediate coats, the topcoat being adhered directly to the primer. The coating under the topcoat has a first color, wherein the discontinuous layer comprises globules and is present on and covers no more than 80% of the area of the coating under the topcoat. The globules comprise one or more suitable pigments such as oxide coated mica particles having at least two different colors, which are visibly different than said first color as seen through said topcoat. The differing colors of the globules result from differences in the thickness and composition of the oxide coatings on the mica particles. The discontinuous layer has been applied in at least two distinctly different colors of globules, with the interference coatings on the mica generating colors which mix additively to form the resulting apparent color mix.

CROSS REFERENCE TO RELATED PATENT APPLICATIONS

The subject matter of the instant invention is related to the following copending and commonly assigned patent applications: (1) U.S. patent application Ser. No. 08/476,929 (FL-0003A), which was filed on Jun. 7, 1995 as a continuation in part of U.S. patent application Ser. No. 08/362,078 (FL-0003) that was filed on Dec. 22, 1994 in the name Kenneth Batzar; (2) U.S. patent application Ser. No. 08/476, 93 1 (FL-0004A), which was filed on Jun. 7, 1995 as a continuation in part of U.S. Pat. No. 08/362,300 (FL-0004) that was filed on Dec. 22, 1994 in the name of Kenneth Batzar; (3) U.S. patent application Ser. No. 08/481,682 (FL-0006A), which was filed on Jun. 7, 1995 as a continuation in part of U.S. patent application Ser. No. 08/362,079 (FL-0006) that was filed on Dec. 22, 1994 in the name of Kenneth Batzar; and (4) U.S. patent application Ser. No. 08/482,373 (FL-0007A), which was filed on Jun. 7, 1995 as a continuation in part of U.S. patent application Ser. No. 08/362,090 (FL-0007) that was filed on Dec. 22, 1994 in the names of Batzar and Mason. The disclosure of the aforementioned related patent applications is hereby incorporated by reference.

DETAILED DESCRIPTION

It has been discovered that, by spraying or spattering globules of at least two different interference color pigments, e.g., micas, unique visual effects can be obtained. While certain individual globules can be connected, normally the globules are present in a discontinuous layer. When the globules are applied onto an undercoating of a different color which is visible through the discontinuous layer, a greater variety of visual effects can be achieved. Preferably, the undercoat is black or another dark color contrasting with light colors in the globules.

For coating cookware, all materials must meet certain sanitary requirements. Some colors are not readily available in reflective pigments which can be employed at elevated temperatures in food contact applications. The word "reflective" as used herein is intended to refer to pigments having a body color which reflects a certain color light after absorbing other colors. This contrasts with interference color pigments such as coated mica. When employing reflective pigments, colors mix subtractively such that yellow and blue form green. In contrast, when employing interference color pigments, colors mix additively such that red and green form yellow. Color additive effects are known and used in television tubes with primary colors red, green, and blue being mixed to give all colors. The reflective primary colors are magenta, yellow and cyan being mixed as dots in color printing to give all colors. Black or white can also be added to either to adjust darkness.

The present invention permits using interference color mixing to obtain colors that previously were unavailable from reflective pigments. The interference colors can be formed by applying globules of at least 2 colors on a relatively dark undercoating. For instance, coating first with copper-colored globules and then blue globules, wherein the globules comprise interference color pigments, onto a black undercoat can achieve a visual effect which, when interpreted by the eye, shows a wine color mixed with blue, copper and black. The effect can seem to shimmer visually as the light or the coated articles are moved in relation to the eye. This effect is different than mixing copper and blue pigments together.

The invention relates to compositions and processes for applying a primer, one or more intermediate coatings, and a topcoat. Suitable primers, intermediate coats and topcoats suitable for use in this invention are described in the teachings of U.S. Pat. Nos. 4,087,394 (Concannon); 5,240,775 (Tannenbaum); 4,180,609 (Vassiliou); 4,118,537 (Vary & Vassiliou); 4,123,401 (Berghmans & Vary); 4,259,375 (Vassiliou) and 4,351,882 (Concannon); the disclosure of each is incorporated by reference. The invention also relates to articles, such as cookware, coated with these compositions.

Heat resistant materials especially useful forming the coatings in this invention include fluoropolymer components. One particularly useful fluoropolymer is polytetrafluoroethylene (PTFE) which provides the highest heat stability among the fluoropolymers. Optionally, the PTFE contains a small amount of comonomer modifier which improves film-forming capability during baking, such as perfluoroolefin, notably hexafluoropropylene (HFP) or perfluoro(alkyl vinyl) ether (PAVE), notably wherein the alkyl group contains 1–5 carbon atoms, with perfluoropropyl vinyl ether (PPVE) being preferred. The amount of modifier may be insufficient to confer melt-fabricability to the PTFE, generally no more than about 0.5 mole %. The PTFE, can have a single melt viscosity, usually about $1\times10^9$ Pa.s, but, if desired, a mixture comprising PTFE's having different melt viscosities can be used to form the fluoropolymer component.

In one aspect of this invention, the fluoropolymer component, is melt fabricable fluoropolymer, either blended with the PTFE, or in place thereof. Examples of such melt-fabricable fluoropolymers include tetrafluoroethylene (TFE) copolymers with one or more of the comonomers as described above for the modified PTFE but having sufficient comonomer content to reduce the melting point significantly below that of PTFE. Commonly available melt-fabricable TFE copolymers include FEP (TFE/HFP copolymer) and PFA (TFE/PAVE copolymer), notably TFE/PPVE copolymer. The molecular weight of the melt-fabricable tetrafluoroethylene copolymers is sufficient to be film-forming and be able to sustain a molded shape so as to have integrity in the primer application. Typically, the melt viscosity of FEP and PFA will be at least about $1\times10^2$ Pa.s and may range to about $60-10\times10^3$ Pa.s as determined at 372° C. according to ASTM D-1238.

The fluoropolymer component is generally commercially available as a dispersion of the polymer in water, which is the preferred form of the composition for this invention for ease of application and environmental acceptability. By "dispersion" it is meant that the fluoropolymer particles are stably dispersed in an aqueous medium, so that settling of the particles does not occur within the time when the dispersion will be used. The stability of the dispersion can be achieved as the result the relatively small size of the fluoropolymer particles, typically on the order of 0.2 micrometers, and the use of one or more surfactants in the aqueous dispersion. Such dispersions can be obtained directly by the process known as dispersion polymerization, optionally followed by concentration and/or further addition of surfactant. Examples of suitable surfactants include at least one of octylphenoxytriethoxyethanol, triethanolamine oleate, among others.

The primer coating for this invention is generally derived from an aqueous dispersion of at least one fluoropolymer and a water soluble or water dispersible film-forming binder material. A suitable primer is described by the U.S. Pat. Nos. 4,087,394 (Concannon); and 5,240,775 (Tannenbaum); hereby incorporated by reference.

The optional intermediate coating(s) and topcoat used in this invention are generally derived from a dispersion of one or more fluoropolymers to which has optionally been added a dispersion of an acrylic polymer. Suitable intermediate coating(s) and topcoat are described by U.S. Pat. Nos. 4,180,609 (Vassiliou); 4,118,537 (Vary & Vassiliou); 4,123,401 (Berghmans & Vary); 4,351,882 (Concannon) hereby incorporated by reference.

The globules, sometimes referred to as spatter ink, of this invention comprises a discontinuous layer having a similar composition as the intermediate coating thus being derived from a dispersion of fluoropolymer to which has optionally been added a dispersion of acrylic polymer. The globules further comprise one or more suitable water dispersible solvents and surfactants, interference pigments (added either directly or as a dispersion), a cerium containing catalyst such as cerium octoate, and an acrylic dispersion. The globules can also include a suitable dye. Examples of suitable dyes include those acceptable for use in foods such as FD&C yellow number 5, blue number 1, red number 40, among others. The FD&C dyes are available commercially from Crompton & Knowles, New Jersey, U.S.A... The amount of dye normally ranges from about 0.05 to about 0.25% of the total weight of the globule composition. One or more dyes can be added for enhancing the ease with which the globule composition is processed. By adding an acceptable dye to the globule composition, the quantity and characteristics of the globules can be monitored during the coating process. That is, certain interference pigments are difficult to detect visually in a wet globule and the presence of one or more dyes functions to indicate the presence of the globules. Normally, the dye is removed from the coated substrate when the substrate is dried.

The film-forming binder component that can be used in forming the primer coating is composed of polymer which is thermally stable. This component is well known in primer applications for non-stick finishes, for adhering the fluoropolymer-containing primer layer to substrates and for film-forming within and as part of the primer layer. The binder is generally non-fluorine containing and yet adheres to the fluoropolymer. Preferred binders are those that are soluble or solubilized in water or a mixture of water and organic solvent for the binder, which solvent is miscible with water. This solubility aids in the blending of the binder with the fluorocarbon component in the aqueous dispersion form. An example of the binder component is polyamic acid salt which converts to polyamideimide upon baking of the composition to form the primer layer. This binder is preferred because in the fully imidized form obtained by baking the polyamic acid salt, this binder has a continuous service temperature in excess of about 250° C. The polyamic acid salt is generally available as polyamic acid having an inherent viscosity of at about 0.1 as measured as a 0.5 wt % solution in N,N-dimethylacetamide at about 30° C. It is dissolved in a coalescing agent, such as N-methylpyrolidone, and a viscosity-reducing agent, such as furfuryl alcohol and reacted with tertiary amine, preferably triethylamine, to form the salt, which is soluble in water, as described in greater detail in U.S. Pat. Nos. 4,014,834 (Concannon) and 4,087,394 (Concannon); the disclosure of both is hereby incorporated by reference. The resultant reaction medium containing the polyamic acid salt can then be blended with the fluoropolymer aqueous dispersion, and because the coalescing agent and viscosity-reducing agent are miscible in water, the blending produces a substantially uniform coating composition. The blending can be achieved by simple mixing of the liquids together without using excess agitation so as to avoid coagulation of the fluoropolymer aqueous dispersion. The proportion of fluoropolymer and binder in compositions of the present invention are in the weight ratios of about 0.5 to 2.5:1. The weight ratios of fluoropolymer to binder disclosed herein are based on the weight of these components in the primer layer formed by baking the composition after application to a substrate. When the composition of the invention is in the preferred aqueous form, these components will constitute about 5 to 50 wt % of the total dispersion.

An inorganic filler film hardener component may be present in the primer composition. The film hardener is one or more filler type materials which are inert with respect to the other components of the composition and thermally stable at baking temperatures which fuse the fluoropolymer and binder. Preferably the film hardener is water insoluble so that it is uniformly dispersible but not dissolved in an aqueous dispersion. By filler-type material is meant that the filler is finely divided, generally having a particle size of about 1 to 200 micrometers, usually 2 to 20 micrometers, which is usually obtained by the film hardener component and which imparts durability to the primer layer by resisting penetration of sharp objects that may penetrate the fluoropolymer overcoat.

Examples of the film hardener include one or more metal silicate compounds such as aluminum silicate and metal oxides, such as, titanium dioxide and calcined aluminum oxide. Examples of such film hardeners are described in copending and commonly assigned U.S. patent application Ser. No. 08/331,843 filed Oct. 31, 1994 in the name of Batzar and U.S. Pat. No. 5,250,356 (Batzar); the disclosure of which is hereby incorporated by reference.

The primer composition of the present invention in aqueous dispersion form may also contain such other additives as adhesion promoters, such as colloidal silica or a phosphate compound, such as a metal phosphate, e.g., Zn, Mn, or Fe phosphate. The composition forming the intermediate coating(s) and topcoat used in the present invention usually contains in addition to the fluoropolymer component, a dispersion of a polymer of monoethylenically unsaturated monomers, such as the acrylic dispersions described in U.S. Pat. Nos. 4,123,401 (Berghmans and Vary) and 4,118,537 (Vary and Vasilliou); hereby incorporated by reference. The coating composition typically shows improved coalescence on curing if a polymer of monoethylenically unsaturated monomers have been added to the fluoropolymer component. The polymer of monoethylenically unsaturated monomers can be any suitable polymer or copolymer (in the sense of being composed of two or more types of monomers) of ethylenically unsaturated monomers which depolymerize, and whose depolymerization products vaporize, in the temperature range of about 150° C. below the fusion temperature of the fluoropolymer used to about the fluoropolymer's decomposition temperature. It may be desirable that the polymer of monoethylenically unsaturated monomers be in solution in a solvent compatible with the rest of the system or be present as a stable dispersion of small particles. For desired results, the average particle size is generally below 1 micron.

Illustrative of polymers which can be used as an additive are polymers of one or more monoethylenically unsaturated monomers which also contain one or more monoethylenically unsaturated acid units. Representative of the monomers are alkyl acrylates and methacrylates having 1–8 carbon atoms in the alkyl group, styrene, alpha-methyl styrene and vinyl toluene. Representative of the acid units are acrylic acid, methacrylic acid, fumaric acid, itaconic acid and maleic acid (or anhydride). Mixtures of these polymers can also be used. The acid units of these polymers can optionally be esterified with glycidal esters of 4–14 carbon atoms. Such a polymer is ordinarily present at a concentration of about 2–300% by weight of the fluoropolymer, and preferably about 5–20%. The preferred polymer additive is an acrylic latex of a methylmethacryylate/ethylacrylate/methacrylic acid 39/57/4 terpolymer.

The compositions forming the primer and intermediate coatings of the present invention often contain one or more pigments, normally in a mill base medium that is either soluble in or miscible with the water of the fluoropolymer aqueous dispersion. The pigment mill base is normally produced by milling (grinding) pigment in its liquid medium, which produces uniformity and small pigment size. The preferred medium is water which contains an amount of a surfactant sufficient for the mill base to become an aqueous dispersion of the pigment by the milling process. Pigments for use in cookware applications have limitations imposed on its use by the U.S. Food and Drug Administration (FDA) because of food contact. Pigments to be used in this invention must be heat stable and nontoxic. Suitable pigments include at least one member from the group of carbon black, titanium dioxide, iron oxide, and zeolites such as ultramarine blue, cobalt blue, among others.

The compositions forming the primer, intermediate coating(s), and topcoat of this invention often contain mica particles, and mica particles coated with pigment. Such particles impart scratch resistance to the articles on which they are coated. Further mica and coated mica can impart a sparkling appearance which tends to mask stains. These particles have an average longest dimension of about 10 to 200 microns, preferably 15–50 microns, with no more than 50% of the particles of flake having longest dimensions of more than about 500 microns. The mica particles coated with pigment are those described in U.S. Pat. Nos. 3,087,827 (Klenke and Stratton); 3,087,828 (Linton); and 3,087,829 (Linton); hereby incorporated by reference.

The micas described in these patents are coated with oxides or hydrous oxides of titanium, zirconium, aluminum, zinc, antimony, tin, iron, copper, nickel, cobalt, chromium, or vanadium. Titanium dioxide coated mica is preferred because of its availability. Mixtures of coated micas can also be used. The mica or coated mica is ordinarily present in the composition of the invention at a concentration of about 0.2–20% by total weight of the composition. The coatings of the present invention can be applied to substrates by a variety of techniques and to a variety of substrates. Roller, dip, and spray coating as well as electrodeposition can be utilized. The substrates can be any material which can withstand the relatively high bake temperatures used to fuse the coatings. Such substrate materials include metals and ceramics, such as aluminum, anodized aluminum, cold-rolled steel, stainless steel, enamel, glass, pyroceram, among others. The substrate can be etched or smooth, and cleaned prior to coating. For pyroceram and some glass, improved results are obtained by activation of the substrate surface such as by slight, chemical etch, which is not visible to the naked eye. The substrate can also be chemically treated with an adhesion agent such as the mist coat of polyamic acid salt disclosed in U.S. Pat. No. 5,079,073 (Tannenbaum); hereby incorporated by reference.

The compositions described above are particularly used to provide an article of cookware, having a cooking surface which comprises a multi-layer, non-stick coating on a substrate which coating minimizes sticking by food residues and which is heat resisting by being stable above about 300° C.

A particularly important feature of the present invention is the globules which can form a spattered or discontinuous coating/layer. The composition forming the spatter coat of this invention is similar to that of an intermediate coating and usually contains fluoropolymer component and a dispersion of a polymer of monoethylenically unsaturated monomers, such as the acrylic dispersions described above and more fully described in U.S. Pat. Nos. 4,123,401 Berghmans and Vary and U.S. Pat. No. 4,118,537 (Vary and Vasilliou); hereby incorporated by reference. The spatter coat comprises a discontinuous layer of globules applied onto the primer coating, or to the optional intermediate layer(s). The primer layer or optional intermediate layer(s) are of a first color or darkness and generally cover the entire cooking surface of the article being coated. The spatter coat or discontinuous layer covers an area of typically no more than 80% of the area covered by the primer or the intermediate coating. The discontinuous layer comprises globules containing oxide-coated mica particles having at least two different colors which are visually different from the first color as seen through the topcoat. The different colors result from differences in thickness and composition of the coatings on the mica, with the interference coatings on the mica generating colors that mix additively to create a resulting apparent color.

In one embodiment of the present invention, the discontinuous coat of globules is applied to a dried surface wherein the primer and optional intermediate coating(s) have been dried or flashed prior to the application of the discontinuous coat. In this embodiment, the globules of the discontinuous layer do not sink into the primer or the intermediate coating and, therefore, produce a discontinuous layer which has a texture or roughness. When a clear or light transmitting topcoat is applied over the discontinuous coat, the globules can be seen through the topcoat and a texture or roughness is communicated to the topcoat.

The discontinuous coating of globules can be applied in any suitable manner, e.g., by using spray gun. While the layer beneath the globules can be wet or dry, normally the globules are wet when applying the topcoat. Normally, drying the layer beneath the globules is achieved by subjecting the surface to an air flow for a period of about 30 seconds or longer. The drying time can be reduced by preheating the substrate or the air. Typically, air temperatures of 150°–400° F. are used. By "dry" it is meant that substantially all of the water present in the underlying layers is removed and the surface does not smear when touched.

In another embodiment, the discontinuous layer having globules with interference coatings on mica particles generating colors which mix additively, can be applied onto a primer or an intermediate layer that is wet. An example of this method is described in U.S. Pat. No. 4,259,375; hereby incorporated by reference. In this embodiment, the primer or optionally the intermediate coating is sufficient wet or fluid so that the globules of the discontinuous coating sink into the underlying coating thereby forming a relatively smooth surface when a topcoat is applied. As in the dry embodiment, the topcoat in the wet embodiment is essentially clear and light transmitting so that the discontinuous layer is visible through the topcoat.

The globules are usually colored to be significantly different from the primer and optional intermediate coating(s) to which they are applied. For best results, the globules are applied by spraying, such as by use of a decorator spray gun, for example model MSA-5016, manufactured by DeVilbiss Ransburg. For the embodiment wherein the undercoating is dry, the globules are preferably sprayed at an angle of from 30 to 75 degrees, and more usually from 45 to 60 degrees depending on the aesthetics desired thereby creating a spattered pattern of non-round globules. The globules or dots can be essentially any desirable configuration having a diameter of from about 0.5–5.0 mm and a height of from about 2.5–12 microns. The globules or dots are generally not interconnecting, although often, and especially when applying multiple spatter coats, the globules are overlapping. However, it is within the scope of this invention to spray the globules at any angle, including 90 degrees which provides essentially round globules or dots.

Normally, it is desirable to avoid forming the globules under conditions that permit the globules to wet the substrate and run together. Those skilled in the art know how to form a discontinuous layer of globules to avoid wetting which might cause the globules to run together. Wetting is generally not a problem for the heat resistant materials used in this invention.

If desired, multiple or successive coats of interference colors can be applied. Such coats wherein the globules of the successive layers are chemically and/or physically different can be applied by spraying either simultaneously or separately. That is, multiple (successive) layers, each layer having a different color, will utilize spray guns which operate to apply globules of color either at the same time in one stage of manufacture, or at separate times in successive stages. Both methods result in generating colors which mix additively to create a resulting apparent color. The globule forming process involves controlling and monitoring three key variables: (1) atomizing air pressure of the spray gun, (2) fluid pressure; and (3) fluid flow rate. By controlling these three variables, the rate and amount of globules being applied can be controlled to obtain the desired result.

While the above Description places particular emphasis upon making surfaces for articles of cookware, the non-stick pattern can be applied to any suitable substrate. Examples of suitable substrates include glass, ceramics, metals, polymers and plastics that can survive the previously described heating step, among other substrates. Further, a virtually unlimited array of colors, patterns, among other characteristics can be obtained by employing the above Description. Further still, more than one surface of a substrate can be coated, e.g., the interior as well as the exterior surfaces of an article of cookware. Moreover, the compositions that are used for forming the layers disclosed herein can include additives, e.g., that affect the viscosity, among other components.

In the examples which follow, parts, percentages and proportions are given by weight except where stated otherwise. These examples are provided for illustration purposes only and do not affect the scope of the invention as defined by the appended claims. Unless indicated otherwise, the apparatus and materials employed in the following examples are commercially available.

EXAMPLE 1

A primer having the composition of Table 1 was sprayed upon a clean, lightly etched aluminum substrate to a dry film thickness (DFT) of 7.5 to 10 microns, the primer was dried at 66° C. for 3 minutes and a black midcoat of Table 2 was applied to a DFT of 17.5 to 20 microns. The midcoat was optionally allowed to dry at ambient temperature for 45 seconds, 2 or more separate globule inks or discontinuous coatings were applied using a DeVilbiss spatter gun to provide a discontinuous coating. Alternatively, the globule forming inks can be applied wet-on-wet on the midcoat before they are allowed to dry. The inks of Table 3 designated copper and blue (A and B) were colored to be significantly different than the black midcoat background and were chosen to provide an additive color of wine. Table 4 provides more detail about solids contents of typical inks including those of Table 3. Each ink was coated individually on the black midcoat covering approximately 40% of the background color. A topcoat of Table 5 was then applied wet-on-wet over the spattered particles. The topcoat, in this example, contains mica particles in a 1–15 micron particle size range so as not to interfere with the aesthetics of the discontinuous layer of globules. The entire system was sintered at 427° to 435° C. for 5 minutes. The temperature being controlled was not that of the oven, but rather that of the substrate metal which will vary with the speed of product through the oven and the length of the oven.

EXAMPLE 2

Substantially the same procedure as Example 1 was followed except the ink used to apply globules to about 80% coverage was a 1:1 mixture of copper and blue inks from Table 3.

A comparison of substrates in Examples 1 and 2 illustrated the following differences. The globule or discontinuous layer color of Example 2 was wine (determined visually). The substrate of Example 1 exhibits the colors of blue, copper and wine when viewed by eye within a distance of about 25 cm. Beyond a distance of about 25 cm., the color appears to be predominantly wine with varying levels of hue depending on the randomization of the 2 globule colors that were applied.

EXAMPLE 3

A primer having the composition of Table 1 was sprayed onto a clean, lightly etched aluminum substrate to a DFT of 7.5 to 10 microns, the primer was dried at about 66° C. for 3 minutes and a black midcoat of Table 2 was applied to a DFT of 17.5 to 20 microns. The midcoat was optionally allowed to dry at ambient temperature for 45 seconds, 2 or more separate inks or globule coatings were applied by using a DeVilbiss spatter gun to provide a discontinuous coating. The inks of Table 3 designated red and green (C and D) were colored to be significantly different than the black midcoat background and were chosen to provide an additive color of yellow. Each ink was applied in a discontinuous layer of globules as follows: the green was coated to cover about 50% of the background color and then the red was coated to cover about 25% of the area.

A topcoat of Table 5 was then applied wet-on-wet over the discontinuous layer of globules. The topcoat, in this example, contained mica particles in a 1–15 micron particle size range so as not to interfere with the aesthetics of the globules. The entire system was sintered at a temperature of about 427° to 435° C. for about 5 minutes. The temperature being controlled was not that of the oven, but rather that of the substrate metal which will vary with the speed of product through the oven and the length of the oven.

EXAMPLE 4

Substantially the same procedure as Example 3 was followed except the ink used to form the discontinuous layer to about 75% coverage was a 2:1 mixture of green and red inks from Table 3.

A comparison of substrates in Examples 3 and 4 illustrated the following differences. The discontinuous layer color of Example 4 was yellow (determined visually). The substrate of Example 3 exhibited the color of red, green and yellow when viewed by eye within a distance of about 25 cm. Beyond a distance of about 25 cm., the color observed by eye appears to be predominately yellow with varying levels of hue depending upon the randomization of the 2 globule colors as applied.

In all of the following Tables: "solvent-surfactant blend" corresponded to approximately 19.5% butyl carbitol, 23.9% mixed aromatic hydrocarbons, 4.7% cerium octoate, 37% triethanolamine, 8% lauryl sulfate, and the balance was water; and "acrylic dispersion" corresponded to approximately 39/57/4 methyl methacrylate/ethyl acrylate/methacrylic acid. The polymer comprised about 40% of the dispersion, 9% triethanolamine, 8% sodium lauryl sulfate, and the balance was water.

TABLE 1

| Primer | Coating Composition (Wt. %) | Solids Content in Finished Article Primer (Wt %) |
|---|---|---|
| Furfuryl Alcohol | 1.82 | — |
| Polyamic acid salt in N-Methyl Pyrrolidine | 18.10 | 24.48 |
| Deionized Water | 48.33 | — |
| Mica | 0.05 | 0.24 |
| PTFE Dispersion | 7.93 | 22.19 |
| FEP Dispersion | 5.88 | 15.08 |
| Colloidal Silica Dispersion | 3.58 | 5.00 |
| Ultramarine blue dispersion | 13.74 | 32.06 |
| Aluminum silicate dispersion | 0.58 | 0.94 |

TABLE 2

| Intermediate | Coating Composition (Wt. %) | Solids Content in Finished Article (Wt. %) |
|---|---|---|
| PTFE Dispersion | 56.34 | 77.43 |
| PFA Dispersion | 10.21 | 14.22 |
| Deionized Water | 4.62 | — |
| Carbon black dispersion | 2.71 | 3.79 |
| Ultramarine blue dispersion | 0.49 | 3.22 |
| Mica | 0.75 | 1.73 |
| Solvent-Surfactant blend | 12.63 | — |
| Acrylic dispersion | 12.23 | — |

TABLE 3

GLOBULE/INK FORMULATION COMPOSITION (PARTS BY WEIGHT)

| | A COPPER | B BLUE | C RED | D GREEN |
|---|---|---|---|---|
| PTFE Dispersion | 604.8 | 604.8 | 604.8 | 604.8 |
| PFA Dispersion | 116.0 | 116.0 | 116.0 | 116.0 |
| Deionized Water | 50.0 | 50.0 | 50.0 | 50.0 |
| Interference Color Flake | 22.7(1) | 22.7(2) | 22.7(3) | 22.7(4) |
| Solvent-Surfactant Blend | 144.0 | 144.0 | 144.0 | 144.0 |
| Acrylic Dispersion | 140.0 | 140.0 | 140.0 | 140.0 |
| Viscosity-cps as measured by Brookfield #2 Spindle @ 20 RPM | 150–225 | 150–225 | 150–225 | 150–225 |

(1)Supplied by E. M. Industries under the Afflair(R) 502 trademark
(2)Supplied by E. M. Industries under the Afflair(R) 225 trademark
(3)Supplied by E. M. Industries under the Afflair(R) 504 trademark
(4)Supplied by E. M. Industries under the Afflair(R) 235 trademark

TABLE 4

GLOBULE/INK FORMULATION COMPOSITION

|  | Coating Composition (Wt. %) | Solids Content in Finished Article (Wt. %) |
|---|---|---|
| PTFE Dispersion | 56.13 | 79.72 |
| PFA Dispersion | 10.77 | 15.29 |
| Deionized Water | 4.64 | — |
| Afflair Flake | 2.10 | 4.99 |
| Solvent-Surfactant Blend | 13.36 | — |
| Acrylic Dispersion | 12.99 | — |

TABLE 5

| Topcoat | Coating Composition (Wt. %) | Solids Content in Finished Article Topcoat (Wt %) |
|---|---|---|
| PTFE Dispersion | 66.73 | 94.04 |
| PFA Dispersion | 3.51 | 4.95 |
| Water | 3.77 | — |
| Mica | 0.43 | 1.01 |
| Solvent-Surfactant Blend | 12.52 | — |
| Acrylic dispersion | 13.04 | — |

In each of the Formulations illustrated in Tables 1–5, preferably Tables 3 and 4, a dye in the amount of about 0.10% of the Composition can be added. For best results, the color of the dye corresponds to the globule color. For example, 0.10 % FD&C blue number 1 can be added to Composition "B" Blue listed in Table 3. Green dye can be obtained by mixing effective quantities of yellow and blue dyes.

The following is claimed:

1. An article having a surface which comprises a multi-layer, non-stick coating, which is heat resistant by being stable at temperatures above 300° C., on a substrate wherein the multi-layer coating comprises (1) a primer adhered to the substrate, (2) a non-stick heat-resistant light-transmitting topcoat, and (3) optionally one or more intermediate coats, with the topcoat adhered to any intermediate coats which are adhered through (4) a discontinuous layer to the primer, or in the absence of intermediate coats, the topcoat being adhered directly to the primer, with the coating under the topcoat having a first color, wherein the discontinuous layer comprises globules and is present on and covers no more than about 80% of the area of the coating under the topcoat, said globules containing particles having at least two different colors, which are visibly different than said first color as seen through said topcoat and mix additively to form the visible color.

2. The article of claim 1 wherein the visible color is an interference color of globules containing mica or mica coated with an oxide.

3. The article of claim 2 wherein the interference colors are formed by particles comprising mica having a copper and blue color, and the resulting apparent color includes wine when viewed from a distance of at least 25 centimeters.

4. The article of claim 1 in which the heat resistant coatings comprise perfluorinated ethylene polymers or copolymers.

5. A method of producing the article of claim 1 which comprises spraying successive coats on a substrate and wherein the globules of different colors in the discontinuous layer are applied by spraying them on the intermediate coat together and then curing the resultant coating.

6. A method of producing the article of claim 1 which comprises spraying successive coats on a substrate and wherein the globules of different colors in the discontinuous layer are applied by spraying them separately on the intermediate coat and then curing the resultant coating.

* * * * *

UNITED STATES PATENT AND TRADEMARK OFFICE
CERTIFICATE OF CORRECTION

PATENT NO. : 5,667,891
DATED : Sept. 16, 1997
INVENTOR(S) : Kenneth Batzar, et al It is certified that error appears in the above-identified patent and that said Letters Patent is hereby corrected as shown below:

On the title page:

Delete "Filed: Jan. 16, 1996" and insert in its place -- Filed: Jan. 12, 1996 --.

Signed and Sealed this

Twenty-ninth Day of August, 2000

Attest:

Q. TODD DICKINSON

*Attesting Officer*  *Director of Patents and Trademarks*